(12) United States Patent
Mayer et al.

(10) Patent No.: US 6,300,403 B1
(45) Date of Patent: Oct. 9, 2001

(54) METHOD FOR PRODUCING POLYMERS STABILIZED WITH PROTECTIVE COLLOIDS

(75) Inventors: Theo Mayer, Julbach; Hans-Peter Weitzel, Reischach; Reinhard Haerzschel, Burghausen; Thomas Bastelberger, Emmerting, all of (DE)

(73) Assignee: Wacker-Chemie GmbH (DE)

( * ) Notice: Subject to any disclaimer, the term of this patent is extended or adjusted under 35 U.S.C. 154(b) by 0 days.

(21) Appl. No.: 09/424,193

(22) PCT Filed: Sep. 24, 1998

(86) PCT No.: PCT/EP98/06102

§ 371 Date: Nov. 19, 1999

§ 102(e) Date: Nov. 19, 1999

(87) PCT Pub. No.: WO99/16794

PCT Pub. Date: Apr. 8, 1999

(30) Foreign Application Priority Data

Sep. 26, 1997 (DE) .............................. 197 42 679

(51) Int. Cl.$^7$ .............................. C08F 2/20; C08F 18/08; C08F 8/12; C08F 6/24

(52) U.S. Cl. .................. 524/459; 524/503; 524/803; 526/202

(58) Field of Search .................. 524/459, 503, 524/803; 526/202

(56) References Cited

U.S. PATENT DOCUMENTS

| 4,397,968 | 8/1983 | Eck et al. . |
| 4,684,704 | 8/1987 | Craig . |
| 4,801,643 | * 1/1989 | Craig ..................... 524/832 |
| 5,849,840 | * 12/1998 | Maruhashi et al. ............. 525/56 |

FOREIGN PATENT DOCUMENTS

| 1 260 145 | 2/1968 | (DE) . |
| 35 90 744 | 1/1992 | (DE) . |
| 42 12 768 | 10/1993 | (DE) . |
| 0 062 106 | 10/1982 | (EP) . |
| 0 538 571 | 9/1996 | (EP) . |
| 1129974-A | * 10/1968 | (GB) ..................... C08F/1/14 |
| 2 181 143 | 4/1987 | (GB) . |
| 96/17891 | 6/1996 | (WO) . |
| 96/20963 | 7/1996 | (WO) . |
| 96/41825 | 12/1996 | (WO) . |
| 97/15603 | 5/1997 | (WO) . |

OTHER PUBLICATIONS

Derwent Abstract corresponding to DE–A 126145 (AN 1968–65613).
Derwent Abstract corresponding to DE–A 4212768 (AN 1993–329249).
Derwent Abstract corresponding to WO 96/17891 (AN 1996–287139).
Derwent Abstract corresponding to EP 538571 (AN 1993–135540).
Derwent Abstract corresponding to WO 96/20963 (AN 1996–333950).
Derwent Abstract corresponding to WO 96/41825 (AN 1997–065428).
T.G. Fox, Bull. Am. Physics Soc., 1, 3, p. 123 (1956).
Polymer handbook, $2^{nd}$ Edition, J. Wiley & Sons, New York (1975).
Derwent Abstract corresponding to DE 3590744 (AN 1986–108718).

* cited by examiner

Primary Examiner—David W. Wu
Assistant Examiner—Kelechi Egwim
(74) Attorney, Agent, or Firm—Brooks & Kushman P.C.

(57) ABSTRACT

A method for producing protective-colloid-stabilized polymers in the form of their aqueous polymer dispersions or in the form of powders which can be re-dispersed in water, wherein one or several monomers from the group made up of vinyl aromatics, 1.3 dienes, acrylic acid esters and methacrylic acid esters of alcohols with 1 to 15 C-atoms are polymerized in the presence of a combination of protective colloids consisting of one or several protective colloids from the group of hydrophobically modified, partly saponified polyvinyl esters which produce a surface tension of $\leq 40$ mN/m as a 2% aqueous solution, and one or several protective colloids which produce a surface tension of >40 mN/m as a 2% aqueous solution.

11 Claims, No Drawings

METHOD FOR PRODUCING POLYMERS STABILIZED WITH PROTECTIVE COLLOIDS

BACKGROUND OF THE INVENTION

1. Field of the Invention

The invention relates to a process for preparing protective-colloid-stabilized polymers in the form of their aqueous polymer dispersions or of their water-redispersible powders.

2. Background Art

Water-redispersible polymer powders, which are obtainable by drying the corresponding polymer dispersions, are known and have been used successfully for many years, particularly in the building sector. They improve the property spectrum of hydraulically setting systems, such as cement mortars, for example their abrasion resistance, their flexural strength in tension and their adhesion. Products of this type, which are available on the market, are usually prepared from polyvinyl acetate, vinyl acetate-ethylene copolymers, vinyl acetate-vinyl ester copolymers or vinyl chloride-ethylene copolymers.

Very high requirements have to be met if a dispersion powder is to be industrially useful: it must be free-flowing, it must not block when stored, i.e. its free-flowing nature must not be lost over time. If blocking of the powder occurs, it becomes practically impossible to handle. Once large agglomerates have formed, they cannot be mixed into the pulverulent formulation. To develop its full effectiveness, the powder must have very good redispersibility in water, giving the original particles of the dispersion.

Redispersion powders compete with dispersions in the individual application sectors and, for example in paints, the binding power of these binders depends in a known manner on particle size. For use in combination with hydraulic binders, such as cement, for improving mortar properties, a main application sector for redispersion powders, the formulations have to remain stable for a certain time and must not change their working consistency significantly (cement stability). This is because the user cannot be expected to remix at frequent intervals. A product of that type would be unacceptable. In the concrete and mortar industry a significant role is played by mechanical properties, such as compressive strength and porosity and the associated air-pore content. If too many air pores are present then there is a severe reduction in compressive strength, and if too few or no air pores are present in the mortar or concrete the building material has insufficient resistance to frost and condensation. In addition, the hydraulically setting systems modified with the dispersion powder should provide adhesion which is better still than that of unmodified systems.

Besides the dispersion powders mentioned, based on polyvinyl acetate, vinyl acetate-ethylene copolymers, vinyl acetate-vinyl ester copolymers or vinyl chloride-ethylene copolymers, there are also known powders based on styrene-butadiene polymers, on styrene-acrylate copolymers and on (meth)acrylate polymers, but the preparation processes and service properties of these are not fully satisfactory.

WO-A 96/17891 relates to the preparation of water-redispersible polymer powders based on vinyl acetate copolymers, styrene-butadiene copolymers and styrene-acrylate copolymers. These polymers are prepared by emulsion polymerization in the presence of conventional emulsifiers, and a mixture of saccharide, anionic alkylaryl emulsifier and polyvinylpyrrolidone is added before the polymer dispersion is dried. WO-A 96/20963 has disclosed a process for preparing water-redispersible polymer powders based on styrene-butadiene polymers, styrene-acrylate polymers and (meth)acrylate polymers. The polymers here are prepared in a two-step polymerization in the presence of emulsifier, giving core-shell polymers, and are dried by spray drying. WO-A 96/41825 likewise relates to dispersion powders based on core-shell polymers. The shell here has saccharide-functional comonomers and crosslinkable comonomers, for covalent linking of the shell to the core. Besides the relatively complicated procedure to prepare the redispersion powders, their service properties and specifically their workability (cement stability) are unsatisfactory due to their relatively small particle sizes.

The recommendation of EP-A 62106 (U.S. Pat. No. 4397968), in order to prepare aqueous dispersions of polyvinyl-alcohol-stabilized copolymers of (meth)acrylate or of styrene, is to improve the water-resistance of the polymers by metering in the main amount of monomers during the polymerization. The drying of the dispersions to give powders is mentioned. A disadvantage of the redispersion powders obtainable in this way is that because of their poor cement stability they cannot be used in cement-containing compositions: the workability period is too short, and even after a short time the compositions change their consistency and become progressively thicker and are no longer workable.

EP-A 538571 has disclosed the use of specific initiator systems for adjusting viscosity and hydrophilicity in preparing polymer dispersions stabilized with partially hydrolyzed polyvinyl alcohol. DE-A 1260145 recommends the use of modified polyvinyl alcohols for preparing finely divided polymer dispersions. A disadvantage is that this procedure only gives dispersions with severe foaming tendencies, a feature which is disadvantageous for their workability and service properties.

In WO-A 97/15603, no stable polymer dispersions are obtained from emulsion polymerization of hydrophobic monomers, such as styrene or butadiene, with stabilization by protective colloids. To obtain stable, protective-colloid-stabilized polymer dispersions from this monomeric starting material, polymerization in the presence of mercapto-functionalized, copolymerizable silanes is recommended. A disadvantage of this procedure is that it is essentially restricted to preparing silane-containing copolymers.

DE-A 4212768 describes the preparation of aqueous polymer dispersions based on styrene polymers, butadiene polymers and (meth)acrylate polymers and the drying of the dispersions to give dispersion powders. The polymerization takes place in the presence of a macromonomer made from a polyalkylene glycol esterified with maleic or fumaric acid.

DE-C 3590744 (GB-A 2181143) describes a process for preparing protective-colloid-stabilized polymers by polymerizing vinyl monomers in the presence of a protective colloid hydrophobicized with oxyalkylene units. A disadvantage in the use of polyvinyl alcohols hydrophobicized with oxyalkylene units is the plasticizing action of oxyalkylene units, which causes blocking and impaired redispersibility in powders produced therewith. The relatively polar character of the oxyalkylene units also markedly reduces water-resistance.

The object was therefore to provide a process for preparing protective-colloid-stabilized polymer dispersions and protective-colloid-stabilized water-redispersible polymer powders, essentially based on styrene-butadiene polymers, styrene-acrylate polymers and (meth)acrylate polymers, overcoming the disadvantages of the prior art described and permitting the preparation of stable polymer dispersions and of polymer powders which have good redispersibility and cement stability.

SUMMARY OF THE INVENTION

The invention provides a process for preparing protective-colloid-stabilized polymers in the form of their aqueous polymer dispersions or of their water-redispersible powders by emulsion polymerization of one or more ethylenically unsaturated monomers in the presence of protective colloid and, if desired, drying the resultant polymer dispersions, which comprises polymerizing one or more monomers selected from the class encompassing vinylaromatic compounds, 1,3-dienes and acrylates and methacrylates of alcohols having from 1 to 15 carbon atoms in the presence of a protective colloid combination made from one or more protective colloids selected from the class consisting of hydrophobically modified, partially hydrolyzed polyvinyl esters which as 2% strength aqueous solution produce a surface tension of $\leq 40$ mN/m, and made from one or more protective colloids which as 2% strength aqueous solution produce a surface tension of >40 mN/m.

DESCRIPTION OF THE PREFERRED EMBODIMENT

Suitable vinylaromatic compounds are styrene and methylstyrene, preferably styrene. Examples of 1,3-dienes are 1,3-butadiene and isoprene, preferably 1,3-butadiene. Preferred methacrylates or acrylates are methyl acrylate, methyl methacrylate, ethyl acrylate, ethyl methacrylate, propyl acrylate, propyl methacrylate, n-butyl acrylate, tert-butyl acrylate, n-butyl methacrylate, tert-butyl methacrylate and 2-ethylhexyl acrylate. Particular preference is given to methyl acrylate, methyl methacrylate, n-butyl acrylate and 2-ethylhexyl acrylate.

If desired, up to 30% by weight, based on the total weight of the monomer phase, of other monomers copolymerizable with vinylaromatic compounds, with 1,3-dienes and with (meth)acrylates, such as ethylene, vinyl chloride or vinyl esters of unbranched or of branched carboxylic acids, may be included in the polymerization.

It is also possible, if desired, to copolymerize from 0.05 to 10% by weight, based on the total weight of the monomer mixture, of auxiliary monomers. Examples of auxiliary monomers are ethylenically unsaturated mono- and dicarboxylic acids, preferably acrylic acid, methacrylic acid, fumaric acid and maleic acid; ethylenically unsaturated carboxamides and ethylenically unsaturated carbonitriles, preferably acrylamide and acrylonitrile; mono- and diesters of fumaric and maleic acid, such as the diethyl and diisopropyl esters, and also maleic anhydride, ethylenically unsaturated sulfonic acids or salts of these, preferably vinylsulfonic acid and 2-acrylamido-2-methylpropanesulfonic acid. Other examples are precrosslinking comonomers, such as comonomers with more than one ethylenic unsaturation, for example divinyl adipate, diallyl maleate, allyl methacrylate and triallyl cyanurate, and post-crosslinking comonomers, for example acrylamidoglycolic acid (AGA), methyl methacrylamidoglycolate (MAGMe), N-methylolacrylamide (NMA), N-methylolmethacrylamide, allyl N-methylolcarbamate, alkyl ethers, such as the isobutoxy ether, or esters of N-methylolacrylamide, of N-methylolmethacrylamide and of allyl N-methylolcarbamate. Other suitable compounds are epoxy-functional comonomers, such as glycidyl methacrylate and glycidyl acrylate. Other examples are silicon-functional comonomers, such as acryloxypropyltri(alkoxy)- and methacryloxypropyltri(alkoxy)silanes, vinyltrialkoxysilanes and vinylmethyldialkoxysilanes. The alkoxy groups present may, for example, be ethoxy and ethoxypropylene glycol ether radicals. Mention may also be made of monomers with hydroxyl or CO groups, for example hydroxyalkyl methacrylates and hydroxyalkyl acrylates, such as hydroxyethyl, hydroxypropyl and hydroxybutyl acrylate and methacrylate, and also compounds such as diacetoneacrylamide and acetyl-acetoxyethyl acrylate and methacrylate.

The selection of monomers and of the proportions by weight of the comonomers here takes place in such a way that the resultant glass transition temperature Tg is generally from −50 to +100° C., preferably from −20 to +40° C. The glass transition temperature Tg of the polymers can be determined in a known manner by differential scanning calorimetry (DSC). The Tg may also be approximately predicted by the Fox equation. According to T. G. Fox, Bull. Am. Physics Soc. 1, 3, page 123 (1956): $1/Tg = x_1/Tg_1 + x_2/Tg_2 + \ldots + x_n/Tg_n$, where $x_n$ is the proportion by weight (% by weight/100) of monomer n and $Tg_n$ is the glass transition temperature in degrees Kelvin of the homopolymer of monomer n. Tg values for homopolymers are listed in Polymer Handbook 2nd Edition, J. Wiley & Sons, New York (1975).

It is particularly preferable to use mixtures with from 20 to 80% by weight of vinylaromatic compound, in particular styrene, and from 80 to 20% by weight of 1,3-diene, in particular 1,3-butadiene; mixtures with from 20 to 80% by weight of vinylaromatic compound, in particular styrene, and from 80 to 20% by weight of acrylate, in particular butyl acrylate and 2-ethylhexyl acrylate; and also mixtures with from 20 to 80% by weight of methacrylate, in particular methyl methacrylate, and from 80 to 20% by weight of acrylate, in particular butyl acrylate and/or 2-ethylhexyl acrylate. The mixtures may, if desired, comprise the above-mentioned auxiliary monomers in the amounts stated. The greatest preference is given to the styrene/1,3-butadiene mixtures and the styrene-acrylate mixtures.

The protective-colloid-stabilized polymers are prepared by emulsion polymerization. The polymerization temperature is generally from 40 to 100° C., preferably from 60 to 90° C. For copolymerizing gaseous comonomers, such as ethylene or vinyl chloride, it is also possible to operate under pressure, generally at from 5 to 100 bar.

The polymerization is initiated with the thermal initiators or redox initiator combinations which are commonly used for emulsion polymerization and are at least to some extent water-soluble. Suitable organic initiators, each of which is soluble to some extent both in water and in the monomers, are hydroperoxides, such as tert-butyl hydroperoxide, tert-butyl peroxopivalate, cumene hydroperoxide and isopropylbenzene monohydroperoxide, or azo compounds, such as azobisisobutyronitrile. Suitable inorganic initiators are the sodium, potassium and ammonium salts of peroxodisulfuric acid. The initiators mentioned are generally used in amounts of from 0.05 to 3% by weight, based on the total weight of the monomers.

The redox initiators used are combinations of the initiators mentioned with reducing agents. Suitable reducing agents are the sulfites and bisulfites of the alkali metals and of ammonium, for example sodium sulfite, the derivatives of sulfoxylic acid, such as the formaldehyde-sulfoxylates of zinc or of an alkali metal, for example sodium hydroxymethanesulfinate, and ascorbic acid. The amount of reducing agent is preferably from 0.01 to 5.0% by weight, based on the total weight of the monomers.

To control the molecular weight, regulating substances may be used during the polymerization. They are usually used in amounts of from 0.01 to 5.0% by weight, based on the monomers to be polymerized, and are metered in separately or else premixed with reaction components. Examples of substances of this type are n-dodecyl mercaptan, tert-dodecyl mercaptan, mercaptopropionic acid, methyl mercaptopropionate, isopropanol and acetaldehyde.

The polymerization mix is stabilized by the protective colloid combination mentioned, and it is preferable not to add emulsifiers. Suitable protective colloids selected from the class of the hydrophobically modified, partially hydrolyzed polyvinyl esters which as 2% strength aqueous solution produce a surface tension of ≦40 mN/m can be obtained, for example, by hydrophobicization of polyvinyl acetate, by copolymerizing vinyl acetate with hydrophobic comonomers. Examples of these are isopropenyl acetate, long-chain, branched and unbranched vinyl esters, preferably having from 7 to 15 carbon atoms, such as vinyl pivalate, vinyl ethylhexanoate, vinyl esters of saturated alpha-branched monocarboxylic acids having 5 or from 9 to 11 carbon atoms, dialkyl maleates and dialkyl fumarates of $C_1$–$C_{12}$-alcohols, for example diisopropyl maleate and fumarate, vinyl chloride, vinyl alkyl ethers of alcohols having at least 4 carbon atoms, for example vinyl butyl ether and $C_2$–$C_{10}$olefins, such as ethene and decene. The hydrophobicization may also take place by polymerizing vinyl acetate in the presence of regulators, such as alkyl mercaptans having a $C_2$–$C_{18}$-alkyl radical, such as dodecyl mercaptan or tert-dodecyl mercaptan. A further possibility for hydrophobicization of polyvinyl acetate is polymeranalogous reaction, for example acetalizing vinyl alcohol units in partially hydrolyzed polyvinyl acetate with $C_{1-4}$ aldehydes, such as butyraldehyde. The proportion of the hydrophobic units is preferably from 0.1 to 10% by weight, based on the total weight of the partially hydrolyzed polyvinyl acetate. The degree of hydrolysis is from 70 to 99.9 mol %, preferably from 84 to 92 mol %, and the Höppler viscosity (DIN 53015, Höppler method, 4% strength aqueous solution) is from 1 to 30 mPas, preferably from 2 to 15 mPas.

Preferred hydrophobically modified, partially hydrolyzed polyvinyl esters are the partially hydrolyzed polyvinyl acetates with from 84 to 92 mol % of vinyl alcohol units and from 0.1 to 10% by weight of units derived from vinyl esters of an alpha-branched carboxylic acid having 5 or from 9 to 11 carbon atoms in the acid radical, isopropenyl acetate and ethene. Particular preference is given to the partially hydrolyzed polyvinyl acetates with vinyl alcohol units and units of vinyl esters of alpha-branched carboxylic acids having 5 or from 9 to 11 carbon atoms, in the amounts mentioned. Examples of vinyl esters of this type are those marketed by Shell as vinyl versatate under the designations VeoVa®5, VeoVa®9, VeoVa®10 and VeoVa®11.

Suitable protective colloids which as 2% strength aqueous solution produce a surface tension of >40 mN/m are partially hydrolyzed polyvinyl acetates, polyvinyl pyrrolidones, carboxymethyl-, methyl-, hydroxyethyl- and hydroxypropylcellulose, poly(meth)acrylic acid, poly(meth) acrylamide, polyvinylsulfonic acids, melamine-formaldehydesulfonates, naphthalene-formaldehydesulfonates, styrene-maleic acid copolymers and vinyl ether-maleic acid copolymers, and dextrins such as yellow dextrin.

The greatest preference is given to combinations of the hydrophobically modified polyvinyl esters mentioned with partially hydrolyzed polyvinyl acetates with a degree of hydrolysis of from 80 to 95 mol % and a Höppler viscosity of from 1 to 30 mPas, preferably from 2 to 15 mpas, which as 2% strength aqueous solution produce a surface tension of >40 mN/m.

The amounts of the protective colloids added during the polymerization are generally from 1 to 15% by weight in total, based on the total weight of the monomers. The weight ratio of hydrophobicized, partially hydrolyzed polyvinyl ester to the protective colloids which as 2% strength aqueous solution produce a surface tension of >40 mN/m is from 10/1 to 1/10. The protective colloids mentioned are obtainable by processes known to the person skilled in the art.

The emulsion polymerization may be carried out as a batch process, with all of the components as an initial charge, or in a feed process, with one or more components introduced during the polymerization. Preference is given to hybrids with an initial charge and feeding. The feeding proceedures may be carried out separately (spatially and chronologically), or all or some of the components to be fed may be preemulsified before feeding.

To initiate the polymerization, all of the thermal initiator may be charged initially, or a portion charged initially and a portion fed in, or else it may all be fed in. The protective colloids are preferably an initial charge. It is also possible for one component of the protective colloid combination to be an initial charge and for the other to be fed in, or for some of the mixture to be an initial charge and the remainder to be fed in as an aqueous solution. The initial charging and/or feeding of the protective colloid constituent is controlled here in such a way that the protective colloid is always present in the polymerization mixture in a sufficient amount of from about 1 to 15% by weight, based on the monomer constituent. The reason for this is that, on the one hand, excessively low amounts allow specks to form and, on the other hand, excessively high amounts cause too great an increase in the viscosity of the dispersion.

After the polymerization has finished, postpolymerization may be carried out, using known methods, to remove residual monomer, for example by postpolymerization initiated with redox catalyst. Volatile residual monomers may also be removed by distillation, preferably at reduced pressure and, if desired, by flushing with inert carrier gases, such as air, nitrogen or steam.

The aqueous dispersions obtainable by the novel process have a solids content of from 30 to 75% by weight, preferably from 40 to 65% by weight. To prepare the water-redispersible polymer powders, the aqueous dispersions are dried, for example by fluidized-bed drying, freeze drying or spray drying. The dispersions are preferably spray dried. This spray drying takes place in conventional spray drying plants, where atomization can be carried out using single-fluid, two-fluid or multifluid nozzles or using a rotary atomizer disk. The discharge temperature selected is generally in the range from 55 to 100° C., preferably from 70 to 90° C., depending on the plant, the Tg of the resin and the desired degree of drying.

The total amount of protective colloid used prior to the drying procedure should preferably be at least 10%.by weight, based on the polymer constituent. To ensure redispersibility, it is generally necessary to add further protective colloids as a spraying aid to the dispersion before it is dried. The spraying aid is generally used in amounts of from 5 to 25% by weight, based on the polymeric constituents of the dispersion.

Suitable spraying aids are partially hydrolyzed polyvinyl acetates; polyvinylpyrrolidones; polysaccharides in water-soluble form, such as starches (amylose and amylopectin), celluloses and their carboxymethyl, methyl, hydroxyethyl and hydroxypropyl derivatives; proteins, such as casein and caseinate, soya protein, gelatin; ligninsulfonates; synthetic polymers, such as poly(meth)acrylic acid, copolymers of (meth)acrylates with carboxy-functional comonomer units, poly(meth)acrylamide, polyvinylsulfonic acids and water-soluble copolymers of these; melamine-formaldehydesulfonates, naphthalene-formaldehyde-sulfonates, styrene-maleic acid copolymers and vinyl ether-maleic acid copolymers. Preferred spraying aids are partially hydrolyzed polyvinyl acetates with a degree of hydrolysis of from 80 to 95 mol % and a Höppler viscosity of from 1 to 30 mPas, which may, if desired, have been modified with isopropenyl acetate units or with vinyl ether units.

A content of up to 1.5% by weight of antifoam, based on the base polymer, has often proven useful during spraying. To increase shelf life by improving resistance to blocking, in particular for powders with a low glass transition temperature, the resultant powder may be mixed with an antiblocking agent (anticaking agent), preferably up to 30% by weight, based on the total weight of polymeric constituents. Examples of antiblocking agents are calcium carbonate and/or magnesium carbonate, talc, gypsum, silica, and silicates with particle sizes preferably in the range from 10 $\mu$m to 10 $\mu$m.

To improve service properties, other additives may be added during spraying. Examples of other constituents of dispersion powder formulations, present in preferred embodiments, are pigments, fillers, foam stabilizers and hydrophobicizing agents.

The protective-colloid-stabilized polymers can be used as dispersion or powder in the application sectors typical for such products.

The examples below serve to illustrate the invention in greater detail:

EXAMPLE 1

1110 ml of demineralized water, 538 g of a 20% strength by weight aqueous solution of a partially hydrolyzed polyvinyl acetate with a degree of hydrolysis of 88 mol % and a Höppler viscosity of the 4% strength solution of 4 mPas (DIN 53015, Höppler method at 20° C.) which produced a surface tension of 44 mN/m when dissolved at 2% strength by weight in water, and also 363 g of a 20% strength by weight aqueous solution of a partially hydrolyzed copolymer made from vinyl acetate and VeoVa®10, with a degree of hydrolysis of 88 mol % and a Höppler viscosity of the 4% strength solution of 4 mPas which produced a surface tension of 37 mN/m when dissolved at 2% by weight in water were the initial charge in a stirred autoclave holding about 5 l. 10% strength by weight formic acid was used to adjust the pH to from 4.0 to 4.2. The vessel was then evacuated, flushed with nitrogen and evacuated again, and a mixture of 112 g of styrene, 168 g of 1,3-butadiene and 8 g of tert-dodecyl mercaptan was drawn in under suction. This mixture had been stabilized by adding 30 mg of benzoquinone to prevent premature polymerization. After heating to 80° C., the polymerization was initiated by running in simultaneously two catalyst solutions, the first consisting of 110 g of demineralized water and 15.5 g of a 40% strength aqueous tert-butyl hydroperoxide solution and the other of 116 g of demineralized water and 13 g of sodium formaldehyde-sulfoxylate. Both of the catalyst solutions were fed at the same rate (18 ml/h). After the polymerization had begun, the feed of a mixture of 951 g of 1,3-butadiene, 634 g of styrene and 9 g of tert-dodecyl mercaptan was started at a rate of 5.3 g/min. After monomer feed had ended, postpolymerization was carried out for a further 2 h at 80° C. with an unchanged feed rate of the initiator solution, and then the initiator solution feed was terminated and the mixture cooled. This gave a stable, coarse-particle (Coulter LS 230; $D_w$=950 nm) dispersion free from coagulated material, with a solids content of 47% and a viscosity (Brookfield viscometer, 20° C., 20 rpm) of 380 mPas. 400 parts by weight of the dispersion were mixed with 200 parts by weight of a 10.3% strength by weight solution of a polyvinyl alcohol (partially hydrolyzed polyvinyl acetate, degree of hydrolysis 88 mol %, viscosity of the 4% strength solution 13 mPas), 0.84 parts by weight of antifoam and 135 parts by weight of water, and thoroughly mixed. The dispersion was sprayed through a two-fluid nozzle. Air pre-pressurized to 4 bar served as the component for spraying, and the droplets formed were dried cocurrrently with air heated to 125° C. The resultant dry powder was mixed with 10% of commercially available antiblocking agent (mixture of calcium magnesium carbonate and magnesium hydrosilicate).

COMPARATIVE EXAMPLE 2

The dispersion was prepared as in Example 1, but with initial charge of 900 g of a 20% strength by weight aqueous solution of a partially hydrolyzed polyvinyl acetate with a degree of hydrolysis of 88 mol % and a Höppler viscosity of the 4% strength solution of 4 mPas which produced a surface tension of 44 mN/m when dissolved at 2% by weight in water, as the sole protective colloid. All other actions were as in Example 1.

COMPARATIVE EXAMPLE 3

The dispersion was prepared as in Example 1, but with initial charge of 900 g of a 20% strength by weight aqueous solution of a partially hydrolyzed copolymer made from vinyl acetate and VeoVa®10 with a degree of hydrolysis of 88 mol % and a Höppler viscosity of the 4% strength solution of 4 mpas which produced a surface tension of 37 mN/m when dissolved at 2% by weight in water, as the sole protective colloid. All other actions were as in Example 1.

EXMAPLE 4

The dispersion was prepared as in Example 1, but alongside the hydrophobically modified protective colloid, and instead of the partially hydrolysed polyvinyl acetate, use was made of 800 g of a 10% strength by weight aqueous solution of a yellow dextrin (Avedex 35, Avebe) which produced a surface tension of 50 mN/m when dissolved as 2% by weight in water. All other actions were as in Example 1.

Testing of the Polymer Powders:
Determination of the Settling Behavior of the Powders (Tube Settlement):

To determine settling behavior, 50 g of each of the dispersion powders were redispersed in 50 ml of water, then diluted to 0.5% solids content, and the height of settled solids is measured for 100 ml of this redispersion poured into a graduated tube, settlement being measured after 1 and 24 hours.

Determination of Blocking Resistance:

To determine blocking resistance, the dispersion powder was placed in an iron tube with a thread, and then subjected to load from a metal ram. The loading procedure was followed by 16 hours at 50° C. in a drying cabinet. After cooling to room temperature, the powder was removed from the tube and the resistance to blocking was determined qualitatively by crushing the powder. The resistance to blocking was classified as follows:

1=very good resistance to blocking

2=good resistance to blocking

3=satisfactory resistance to blocking

4=not resistant to blocking—powder after crushing no longer free-flowing.

Determination of the Air Content in the Mortar:

A DIN mortar was mixed in accordance with DIN 1164 to the following specification, with a water-cement factor W/C of 0.45 and a polymer-cement factor P/C of 0.15:

| | |
|---|---|
| Portland cement PZ-35F | 900 g |
| Standard sand | 2700 g |
| Silicone antifoam S-860 (Wacker Chemie) | 7.2 g |
| Dispersion powder | 135 g |
| Water | 405 g |

The air content was determined using DIN 18555 Part2.

Determination of Cement Stability:

A cement mixture was mixed to the following specification:

| | |
|---|---|
| Portland cement | 82.5 g |
| Calcite (CaCO$_3$) 10–40 mm | 75 g |
| Quartz sand 200–500 mm | 128 g |
| Dispersion powder | 15 g |
| Water | 85 g |

The workability of the cement mixture was observed and assessed qualitatively over a period of 2 hours.

The test results are given in Table 1.

TABLE 1

| Example | Tube settlement 1 h/24 h [cm] | Blocking resistance | Air content in the mortar | Cement stability |
|---|---|---|---|---|
| Ex. 1 | 0.1/0.5 | 2 | 6% | 2 h |
| Comp. Ex. 2 | 0.4/0.9 | 2 | 4% | 15 minutes |
| Comp. Ex. 3 | 0.4/3.2 | 4 | 14% | 2 h |
| Ex. 4 | 0.2/0.7 | 2 | 6% | 2 h |

Using the novel procedure (Examples 1 and 4), it is possible, even starting from copolymers of hydrophobic comonomers, such as styrene and butadiene, to obtain dispersion powders which are distinguished by very good redispersibility (tube settlement) and very good service properties (cement stability). If the emulsion polymerization is carried out solely in the presence of conventional protective colloids which are not hydrophobically modified (Comparative Example 2), the service properties (cement stability) of the powders thus obtained are unsatisfactory. If stabilization is solely with hydrophobically modified protective colloid (Comparative Example 3), the powders obtained have markedly poorer redispersibility and unsatisfactory resistance to blocking.

What is claimed is:

1. A process for preparing protective-colloid-stabilized polymers in the form of their aqueous polymer dispersions or of their water-redispersible powders by emulsion polymerization of one or more ethylenically unsaturated monomers in the presence of protective colloid and, optionally, drying the resultant polymer dispersions, which comprises polymerizing one or more monomers selected from the group consisting of vinylaromatic compounds, 1,3-dienes and acrylates and methacrylates of alcohols having from 1 to 15 carbon atoms in the presence of a protective colloid combination made from one or more protective colloids selected from the group consisting of hydrophobically modified, partially hydrolyzed polyvinyl esters which as 2% strength aqueous solution produce a surface tension of ≦40 mN/m, and made from one or more protective colloids which as 2% strength aqueous solution produce a surface tension of >40 mN/m.

2. A process as claimed in claim 1, wherein the hydrophobically modified, partially hydrolyzed polyvinyl esters used are those having a degree of hydrolysis of from 70 to 95 mol % and a Höppler viscosity of from 1 to 30 mPas, and obtained by copolymerizing vinyl acetate with hydrophobic comonomers.

3. A process as claimed in claim 1, wherein the hydrophobically modified, partially hydrolyzed polyvinyl acetates used are one or more selected from the group consisting of the partially hydrolyzed polyvinyl esters having from 84 to 92 mol % of vinyl alcohol units and from 0.1 to 10% by weight of vinyl ester units of vinyl esters of an alpha-branched carboxylic acid having 5 or from 9 to 11 carbon atoms in the acid radical, isopropenyl acetate units or ethene units.

4. A process as claimed in claims 1, wherein the protective colloids which as 2% strength aqueous solution produce a surface tension of >40 mN/m are one or more materials selected from the class encompassing partially hydrolyzed polyvinyl acetates, polyvinylpyrrolidones, carboxymethyl-, methyl-, hydroxyethyl- and hydroxypropylcellulose, poly(meth)acrylic acid, poly(meth)acrylamide, polyvinyl sulfonic acids, melamine-formaldehydesulfonates, naphthalene-formaldehydesulfonates, styrene-maleic acid copolymers, vinyl ether-maleic acid copolymers and dextrins.

5. A process as claimed in claim 4, wherein polymerization is carried out in the presence of partially hydrolyzed polyvinyl acetate having a degree of hydrolysis of from 80 to 95 mol % and a Höppler viscosity of from 1 to 30 mpas.

6. A process as claimed in claim 1, wherein the ethylenically unsaturated monomers polymerized are selected from the group consisting of mixtures with from 20 to 80% by weight of a vinylaromatic compound and from 80 to 20% by weight of 1,3-diene, mixtures with from 20 to 80% by weight of a vinylaromatic compound and from 80 to 20% by weight of an acrylate, and mixtures with from 20 to 80% by weight of methacrylate and from 80 to 20% by weight of acrylate.

7. A process as claimed in claim 1, wherein there is also copolymerization of from 0.05 to 10% by weight, based on the total weight of the monomer mixture, of auxiliary monomers selected from the group consisting of ethylenically unsaturated mono- and dicarboxylic acids, ethylenically unsaturated carboxamides, ethylenically unsaturated carbonitriles, mono- and diesters of fumaric acid and maleic acid, ethylenically unsaturated sulfonic acids and salts of these, precrosslinking comonomers with more than one ethylenic unsaturation, post-crosslinking comonomers, epoxy-functional comonomers, silicon-functional comonomers and comonomers having hydroxyl or CO groups.

8. A process as claimed in claim 1, wherein the polymer dispersion is dried by spray drying, optionally after adding further protective colloids.

9. A process as claimed in claim 1, wherein the hydrophobically modified, partially hydrolyzed polyvinyl esters used are those having a degree of hydrolysis of from 70 to 95 mol % and a Höppler viscosity of from 1 to 30 mPas obtained by copolymerizing vinyl acetate with hydrophobic comonomers selected from the group consisting of isopropenyl acetate, long-chain, branched and unbranched vinyl esters, vinyl esters of saturated alpha-branched monocarboxylic acids having 5 or from 9 to 11 carbon atoms, dialkyl maleate, dialkyl fumarate, vinyl chloride, vinyl alkyl ethers of alcohols having at least 4 carbon atoms and $C_2$–$C_{10}$ olefins.

10. A process as claimed in claim 1, wherein the hydrophobically modified, partially hydrolyzed polyvinyl esters used are those having a degree of hydrolysis of from 70 to 95 mol % and a Höppler viscosity of from 1 to 30 mPas, obtained by polymerizing vinyl acetate in the presence of alkyl mercaptan regulators, having a $C_2$–$C_{18}$-alkyl radical.

11. A process as claimed in claim 1, wherein the hydrophobically modified, partially hydrolyzed polyvinyl esters used are those having a degree of hydrolysis of from 70 to 95 mol % and a Höppler viscosity of from 1 to 30 mpas, and obtained by acetalizing vinyl alcohol units in partially hydrolyzed polyvinyl acetates with $C_1$–$C_4$ aldehydes.

* * * * *

UNITED STATES PATENT AND TRADEMARK OFFICE
CERTIFICATE OF CORRECTION

PATENT NO. : 6,300,403 B1
DATED : October 9, 2001
INVENTOR(S) : Theo Mayer et al.

It is certified that error appears in the above-identified patent and that said Letters Patent is hereby corrected as shown below:

<u>Title page, Item [54] and Column 1, lines 1-3,</u>
The title should read -- PROCESS FOR PREPARING PROTECTIVE-COLLOID-STABILIZED POLYMERS --.

<u>Column 10,</u>
Line 27, delete "claims" and insert therefor -- claim --.
Line 41, delete "mpas" and insert therefor -- mPas --.

<u>Column 12,</u>
Line 8, delete "mpas" and insert therefor -- mPas --.

Signed and Sealed this

Eighteenth Day of June, 2002

*Attest:*

*Attesting Officer*

JAMES E. ROGAN
*Director of the United States Patent and Trademark Office*